United States Patent [19]

Miura et al.

[11] Patent Number: 4,468,572

[45] Date of Patent: Aug. 28, 1984

[54] FEEDER VOLTAGE COMPENSATING APPARATUS FOR ELECTRIC RAILWAY

[75] Inventors: Azusa Miura, Ageo; Kesao Kambara, Tokyo; Takashi Kinoshita, Kiyose; Toshio Suzuki, Takarasuka; Yuzuru Yonehata, Itami, all of Japan

[73] Assignees: Japanese National Railways; Mitsubishi Denki Kabushiki Kaisha, both of Tokyo, Japan

[21] Appl. No.: 434,710

[22] Filed: Oct. 15, 1982

[30] Foreign Application Priority Data

Oct. 15, 1981 [JP] Japan .................. 56-164676

[51] Int. Cl.$^3$ ............................ H02J 7/34; H02J 1/12
[52] U.S. Cl. ................................ 307/69; 307/19; 307/46
[58] Field of Search .................. 307/18, 19, 21, 22, 307/45, 46, 48, 49, 82, 69; 320/50

[56] References Cited

U.S. PATENT DOCUMENTS

| 637,119 | 11/1899 | Hunter | 307/69 |
| 4,059,772 | 11/1977 | Wilkerson | 307/46 |

FOREIGN PATENT DOCUMENTS

| 22526 | 2/1980 | Japan | 307/82 |

*Primary Examiner*—William H. Beha, Jr.
*Attorney, Agent, or Firm*—Wenderoth, Lind & Ponack

[57] ABSTRACT

This invention serves to reduce the drop of feeder voltage in an electric railway, and relates to a feeder voltage compensating apparatus for electric railways wherein an accumulator and a thyristor rectifier are connected by a thyristor switch circuit which can change-over the charging and discharging directions of the accumulator.

5 Claims, 7 Drawing Figures

FEEDER VOLTAGE COMPENSATING APPARATUS FOR ELECTRIC RAILWAY

BACKGROUND OF THE INVENTION

This invention relates to a D.C. power supply apparatus which prevents a feeder voltage drop in an electric railway power line adopting a D.C. feeding system.

In the electric railway power line which adopts a D.C. feeding system, rectifier substations have heretofore been installed at intervals of several kilometers to about 10 kilometers. In a high capacity substation, electric power is received at an extra-high voltage of at least 20 kV and is converted into a predetermined D.C. voltage, which is fed to an overhead line.

However, in the case where an extra-high voltage feeder does not exist near a site for installing the substation, feeding facilities for the extra-high voltage must be disposed over a long distance to the position of the substation, and the installation cost of the rectifier substation including the expenses of the feeding facilities becomes very high. On the other hand, when as a countermeasure, the rectifier substations are installed in places accessible to receiving electric power of the extra-high voltage, the intervals of the rectifier substations become very long in some cases. This leads to the problem that the D.C. overhead line voltage at an intermediate point between two adjacent substations or at an end point (remotest point from the last substation) lowers abnormally during the running of an electric vehicle or train.

SUMMARY OF THE INVENTION

This invention has been made in order to solve the above mentioned problems, and provides a D.C. power supply apparatus which can effectively relieve a voltage drop at the intermediate points between substations without disposing extra-high voltage feeding facilities over a long distance.

BRIEF DESCRIPTION OF THE DRAWINGS

In the drawings, the same symbols indicate the same or corresponding parts.

DESCRIPTION OF THE PREFERRED EMBODIMENTS

Embodiments of the present invention will be described with reference to the drawings.

Figure 1:
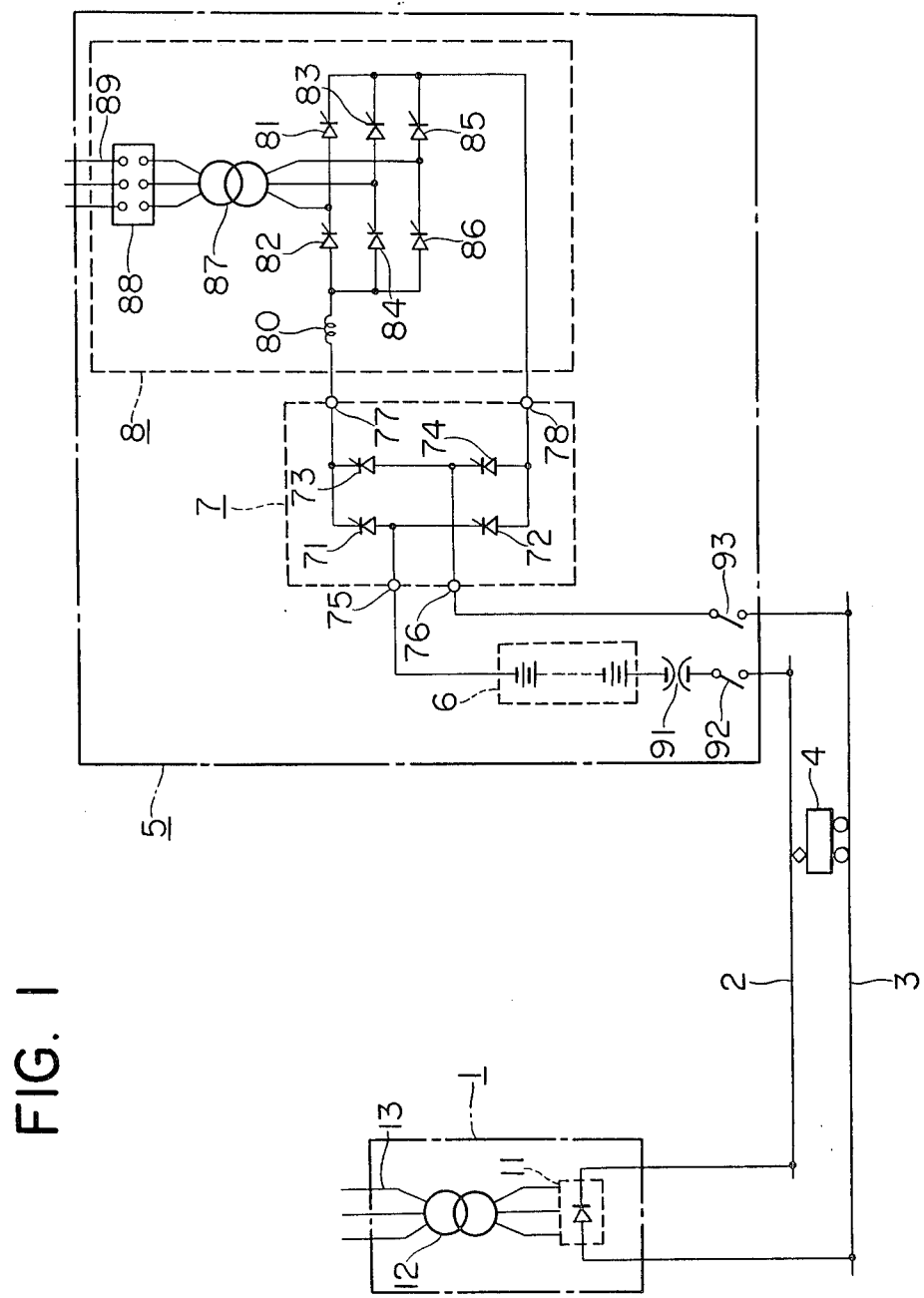
FIG. 1 is a circuit arrangement diagram showing an embodiment of the present invention.

Referring to FIG. 1, a main substation 1 is constructed of a rectifier 11 and a transformer 12, and has a power receiving line 13 for receiving electric power at an extra-high voltage of e.g., 60 kV. Further illustrated are a feeder and trolley line 2, a rail 3, an electric vehicle or train 4, a feeder voltage compensating apparatus 5 according to the present invention. The compensating apparatus comprises an accumulator 6, a thyristor switch circuit 7 which includes thyristor switches 71–74 and terminals 75–78 and a rectifier 8 which is constructed of a smoothing reactor 80, thyristors 81–86, a transformer 87, an A.C. circuit breaker 88, a power receiving line 89 which receives electric power at a high voltage of, e.g., 6 kV, a mechanical or thyristor type high-speed circuit breaker 91, and disconnecting switches 92, 93. The operation of the above embodiment will be described hereinbelow.

First, for the case where thyristor switches 72 and 73 are in the "on" state, current is permitted to flow in the direction of discharging the accumulator 6 along a path consisting of the rail 3→disconnecting switch 93→thyristor switch 73→rectifier 8→thyristor switch 72→accumulator 6→high-speed circuit breaker 91→disconnecting switch 92→feeder line 2. Utilizing the voltage control of the rectifier 8, the output of the feeder voltage compensating apparatus 5 can be subjected to a control for providing a constant voltage having a current limiting function, etc.

On the other hand, when thyristor switches 71 and 74 are turned "on", current is permitted to flow in the direction of charging the battery 6 along a path consisting of the feeder and trolley line 2→disconnecting switch 92→high-speed circuit breaker 91→accumulator 6→thyristor switch 71→rectifier 8→thyristor switch 74→disconnecting switch 93→rail 3. Utilizing the voltage control of the rectifier 8, it is possible to control the charging current to be a desired constant current value or to establish a voltage limiting function so as to control the terminal voltage of the accumulator 6 as well as preventing the overcharge of this accumulator.

A specific example for the present invention for the above described arrangement will be explained below.

It is assumed that the rated voltage of the feeder line 2 is 1,500 v, that the capacity of the main substation 1 is 1,500 kW, and that the voltage - current characteristic of the main substation is as follows:

$$E_{ss} = E_{do} - R_{ss} I_{ss} \qquad \text{Equation (1)}$$
$$= 1,620 \text{ V} - 0.12 \, \Omega \, I_{ss}$$

where
$E_{ss}$: main-substation voltage,
$I_{ss}$: main-substation current,
$E_{do}$: main-substation no-load voltage,
$R_{ss}$: main-substation equivalent resistance.

It is also assumed that the distance between the main substation 1 and the feeder voltage compensating apparatus 5 according to the present invention is 15 km, that the electric vehicle line resistance (the overall resistance of the feeder line, trolley line, rail, etc.) is 0.04 $\Omega$/km, and that the peak value $I_p$ of the vehicle current is 1,000 A. Further, the characteristic of the feeder voltage compensating apparatus 5 according to the present invention will be studied on an operation in which the output voltage $E_B$ of the apparatus is constant at 1,150 V for an output current $I_B$ below 300 A, while the output voltage $E_B$ is not limited to 1,150 V when and after the output current $I_B$ has reached 300 A, that is, for the case where constant voltage control having a current limiting function is performed.

Figure 2:
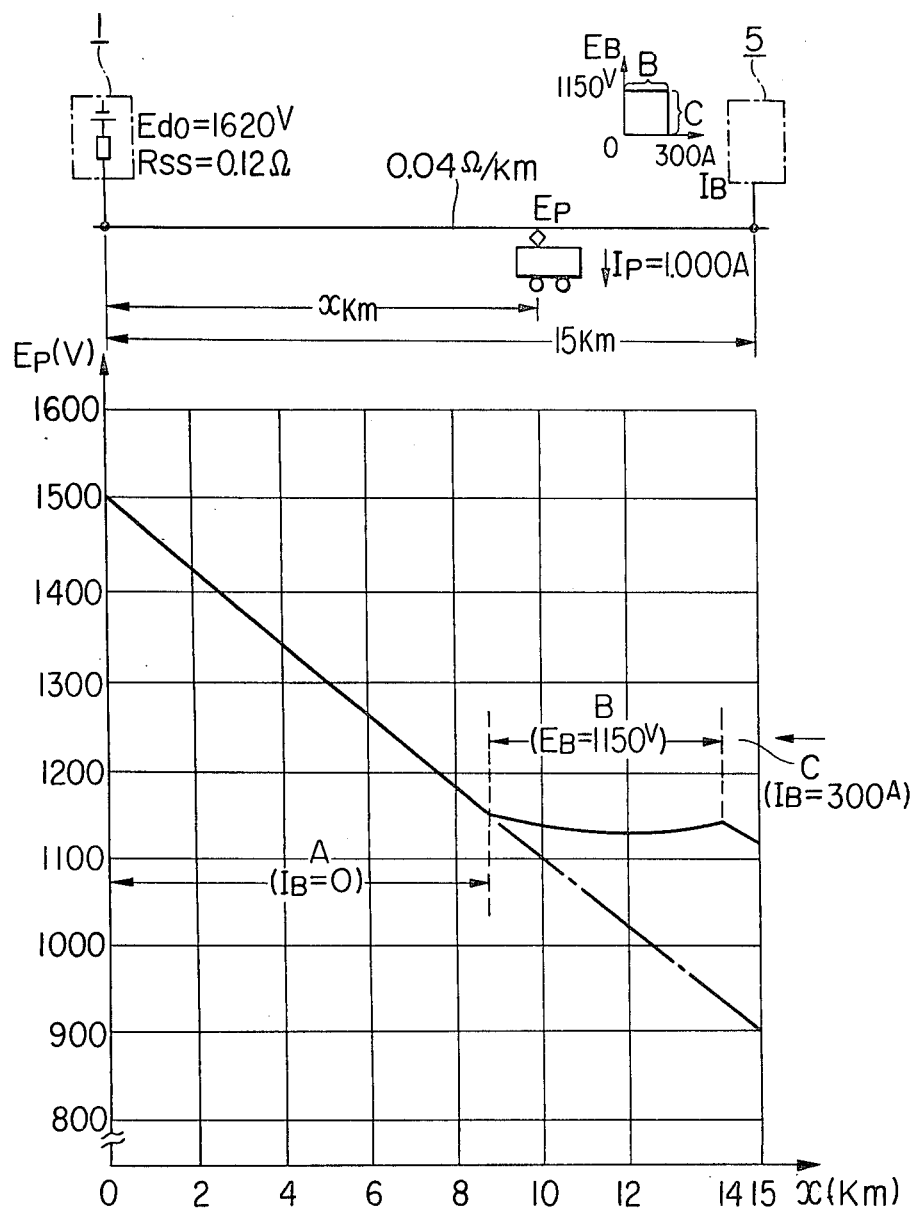
FIG. 2 is a graph for explaining the effects of the present invention.

This characteristic is illustrated in the right upper part of FIG. 2 depicted for explaining the effects of the present invention. Since the rectifier 8 is constructed of a thyristor bridge, it is capable of, not only a converter operation for providing a voltage in the positive direction, but also an inverter operation for providing a voltage in the negative direction. Therefore, it can control voltages in a wide range.

Supposing now that the position of the vehicle 4 is represented by a distance x km from the main substation 1 and that a starting current of 1,000 A is flowing at the point, the pantograph point voltage $E_p$ of the vehicle 4 becomes the value indicated by the dot-and-dash line in the graph of FIG. 2, in the absence of the feeder voltage compensating apparatus 5. That is, the voltage at the farthest point from the main substation 1 (a point of x=15 km) drops down to 900 V.

When the feeder voltage compensating apparatus according to the present invention is therefore disposed at the point of x=15 km, the pantograph point voltage $E_p$ of the vehicle 4 becomes a value indicated by the solid line in the graph of FIG. 2, and good vehicular pantograph point voltages are obtained throughout the 15 km distance. In addition, the feeder voltage compensating apparatus 5 may have an output capacity of 1,150 $V_{D.C.}$ x 300 A=345 kW, and it can receive electric power at a voltage as high as, e.g., 6 kV as stated before. It is accordingly understood that the compensating apparatus is economical and is highly effective. Conversely, for the case of charging the accumulator, the charging current is usually lower than about 1/10 of the discharging current and therefore affects the electric vehicles' line very little.

In FIG. 2 the region A is in a range where the pantograph point voltage can be held above 1,150 V when supplying electric power from the main substation 1 and no output current $I_B$ from the feeder voltage compensating apparatus 5 is required. Further, in region B the pantograph point voltage is held at approximately 1,150 V by supplying power from the main substation 1 and the feeder voltage compensating apparatus 5, wherein the output voltage $E_B$ of the feeder voltage compensating apparatus 5 is 1,150 V, while the output current $I_B$ is not greater than 300 A. Further, a region C is a range in which the output current $I_B$ of the feeder voltage compensating apparatus 5 is limited so as not to exceed 300 A.

The case of supplying power from one main substation 1 has been described above. However, it is understood that the present invention is also applicable to cases of a section between two main substations, etc.

Hereafter, the change-over control of the thyristor switch circuit 7 will be considered.

In the case where the thyristor switches 71 and 74 are "on" (charging state) and the case where thyristor switches 72 and 73 are turned "on" (discharging state), the following method may be relied on. The gates of the thyristor switches 71 and 74 are first turned "off", and the mechanical or thyristor type high-speed circuit breaker 91 is subsequently opened, to cause the charging current to be 0. Thus, the thyristor switches 71 and 74 are turned "off". Thereafter, the high-speed circuit breaker 91 is closed, and the gates of the thyristor switches 72 and 73 are turned "on" so as to turn "on" these thyristor switches. The change-over from the discharging state to the charging state can be executed by a similar method. Regarding the change-over methods, since the switching frequency of the high-speed circuit breaker 91 is high, the thyristor type contactless circuit breaker is useful, whereas there is a mechanical limitation in lifetime in case of mechanical type circuit breaker.

The present invention therefore provides also means for changing-over the charging and discharging directions of the thyristor switch circuit 7 without the opening and closure of the high-speed circuit breaker 91.

Figure 3:
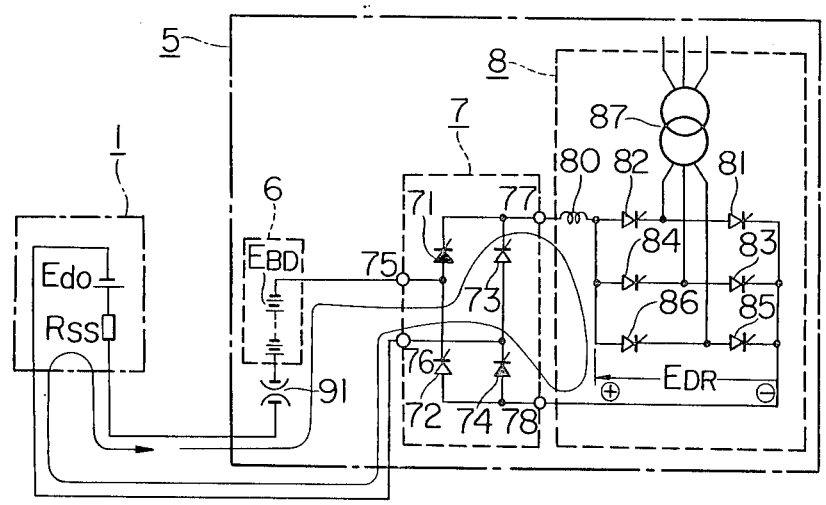
FIGS. 3 and 4 are simplified circuit connection diagrams for the cases where thyristor switches are turned "off" from the charged and discharged states of an accumulator in the present invention, respectively.

FIG. 3 is a simplified circuit connection diagram showing a method for turning "off" the thyristor switches 71 and 74 under the charging state. The path of current flow is indicated in a solid line and indicates a charging current.

As is apparent from FIG. 3, the thyristor bridge constructed of the thyristors 81–86 performs the inverter operation, and the charging current therefrom can be reduced to zero, by controlling the thyristor switches 71 and 74 which can be readily turned "off" by turning their gates "off".

That is, the desired specification constants of the circuit arrangement may be set and the phase control of the rectifier 8 may be determined so as to hold the following relationship among the no-load voltage $E_{do}$ of the main substation 1, the voltage $E_{BD}$ of the battery at the time at which this battery is going to discharge, and the maximum value $E_{DR}$ of the inverter operation voltage of the rectifier 8 so that:

$$E_{DR} > E_{do} - E_{BD} \qquad \text{Equation (2)}$$

The same applies to a method for turning "off" the thyristor switches 72 and 73 under the discharging state. As seen from FIG. 4 showing a simplified circuit connection diagram, the following relationship may be held among the pantograph point voltage $E_p$ of the vehicle, the battery voltage $E_{BC}$ at the time at which the battery is going to charge, and the maximum value $E_{DR}$ of the inverter operation voltage of the rectifier 8 so that:

$$E_{DR} > E_{BC} - E_p \qquad \text{Equation (3)}$$

Figure 4:
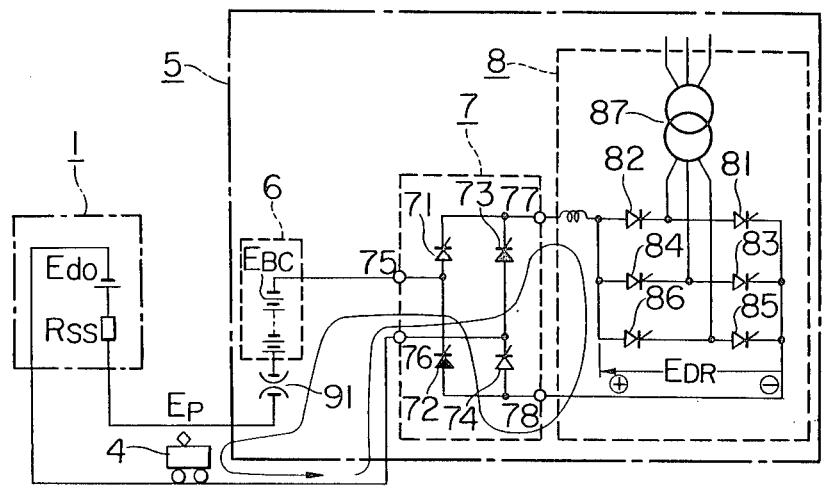

The current indicated by the solid line in FIG. 4 is a discharging current.

According to these methods, the high-speed circuit breaker 91 is normally in the closed state and can be used for an interrupting operation in case of an accident, and the thyristor switches 71–74 can be turned "off" by bringing the rectifier 8 into the inverter operation through a phase control, so that the change-over from the charging and discharging states can be smoothly effected.

Further, the present invention provides different means for changing-over the charging and discharging states.

Figure 5:
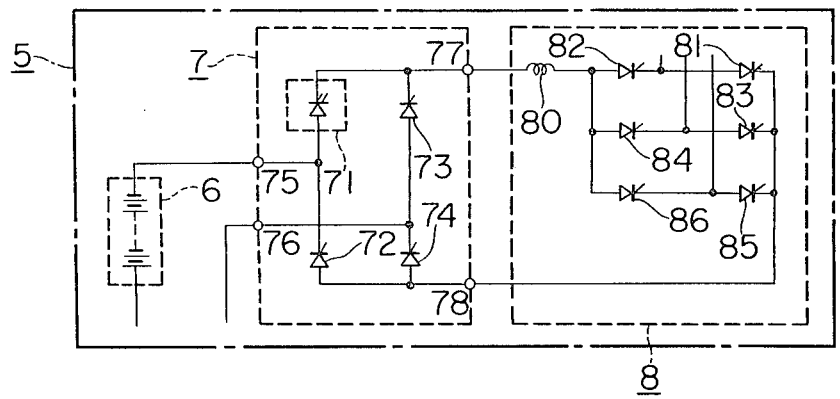
FIGS. 5 to 7 are circuit connection diagrams each showing the essential portions of another embodiment of the present invention.
Figure 6:
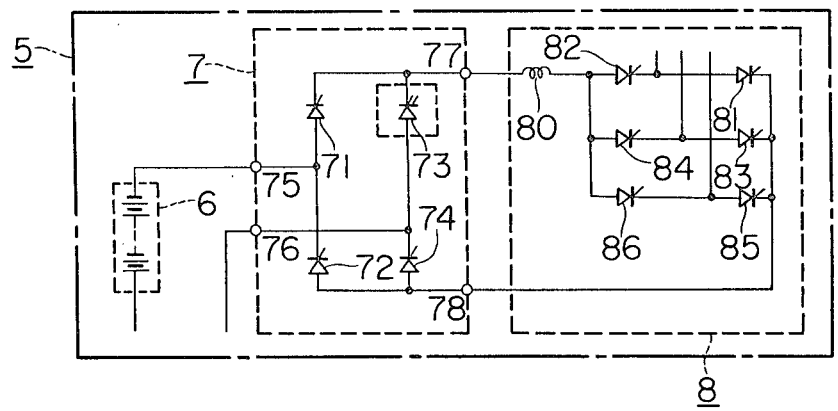
Figure 7:
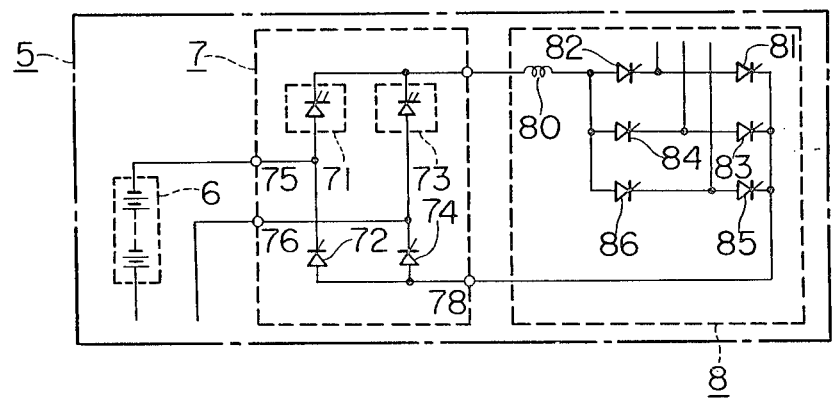

FIGS. 5 to 7 show other embodiments of this invention. In FIG. 5, a thyristor switch with a forced commutation circuit which has a current interrupting capability is used as the thyristor switch 71, and the same symbols as in FIG. 1 indicate the same or corresponding parts. With the circuit of FIG. 5, the condition of Equation (2) need not always be met for turning "off" the thyristor switches 71 and 74 under the charging state, and the voltage of the inverter operation of the rectifier 8 need not be great, so that the installation capacity of the rectifier 8 can be reduced. This is useful particularly in a case where the output voltage of the rectifier 8 is predominantly determined by Equation (2).

Likewise, in the case where the output voltage of the rectifier 8 is predominantly determined by Equation (3), it is useful to make the thyristor switch 73 the thyristor switch with the forced commutation circuit which has current interrupting capability, as illustrated in FIG. 6. In addition, when both Equations (2) and (3) are predominant to the same extent, it is useful to make both the thyristor switches 71 and 73 the thyristor switches with the forced commutation circuits which have current interrupting capability, as illustrated in FIG. 7.

As set forth above, a feeder voltage compensating apparatus according to the present invention compensates for a drop in feeder voltage. Furthermore, the apparatus may be small in output capacity and can be driven by receiving electric power at a high voltage of, e.g., 6 kV without requiring the reception of electric power at an extra-high voltage as required in a main substation. Consequently, the apparatus is subject to few restrictions in installation and is useful. In addition, the apparatus is made more effective because methods permitting smooth change-over between charging and discharging states are provided.

What is claimed is:

1. A feeder voltage compensating apparatus for an electric railway, comprising:
   a thyristor switch circuit in which two sets of circuit paths, each consisting of first and second thyristor switches connected in series, are connected in parallel;
   an accumulator which is connected to a node between said first and second thyristor switches in one of said two sets of circuit paths of said thyristor switch circuit, and which has a current capacity capable of conducting a required current to be delivered to a feeder line; and
   a rectifier which is connected across terminals of said thyristor switch circuit, and which can conduct and control currents corresponding to a charging current and a discharging current of said accumulator;
   an end of said accumulator remote from the aforementioned node and also a node between said first and second thyristor switches in the other circuit path of said thyristor switch circuit being connected to power feed lines.

2. A feeder voltage compensating apparatus for an electric railway as defined in claim 1, wherein said rectifier is constructed of a thyristor bridge, and it performs an inverter operation at the change-over from the charging current to the discharging current or vice versa so as to reduce the conduction current, thereby to turn "off" said thyristor switch circuit.

3. A feeder voltage compensating apparatus for an electric railway as defined in claim 1, wherein in said thyristor switch circuit, at least one of said thyristor switches for conducting the charging current is a thyristor switch with a forced commutation circuit.

4. A feeder voltage compensating apparatus for an electric railway as defined in claim 3, wherein in said thyristor switch circuit, at least one of said thyristor switches for conducting the discharging current is a thyristor switch with a forced commutation circuit.

5. A feeder voltage compensating apparatus for an electric railway as defined in claim 1, wherein in said thyristor switch circuit, at least one of said thyristor switches for conducting the discharging current is a thyristor switch with a forced commutation circuit.

* * * * *